| (12) | United States Patent | (10) Patent No.: | US 7,677,530 B2 |
|---|---|---|---|
| | Hasunuma | (45) Date of Patent: | Mar. 16, 2010 |

(54) FLOW RATE REGULATION VALVE

(75) Inventor: Masahiro Hasunuma, Saitama (JP)

(73) Assignee: Surpass Industry Co., Ltd., Saitama (JP)

( * ) Notice: Subject to any disclaimer, the term of this patent is extended or adjusted under 35 U.S.C. 154(b) by 139 days.

(21) Appl. No.: 11/720,150

(22) PCT Filed: Oct. 3, 2005

(86) PCT No.: PCT/JP2005/018597

§ 371 (c)(1),
(2), (4) Date: May 24, 2007

(87) PCT Pub. No.: WO2006/057108

PCT Pub. Date: Jun. 1, 2006

(65) Prior Publication Data

US 2008/0006792 A1 Jan. 10, 2008

(30) Foreign Application Priority Data

Nov. 25, 2004 (JP) ............................. 2004-340538

(51) Int. Cl.
*F16K 51/00* (2006.01)
(52) U.S. Cl. .................... 251/285; 251/92; 251/122
(58) Field of Classification Search ............... 251/90, 251/92, 93, 122, 284, 285
See application file for complete search history.

(56) References Cited

U.S. PATENT DOCUMENTS

| 3,292,895 | A | * | 12/1966 | Leger et al. ................. 251/83 |
| 3,601,362 | A | * | 8/1971 | Gunther ..................... 251/285 |
| 4,687,181 | A | * | 8/1987 | Simonelli et al. ............ 251/223 |
| 5,188,338 | A | * | 2/1993 | Itoi ............................. 251/265 |
| 5,351,936 | A | * | 10/1994 | Tanikawa et al. ............ 251/278 |
| 6,196,523 | B1 | * | 3/2001 | Miyata et al. ............... 251/276 |

FOREIGN PATENT DOCUMENTS

| JP | 49142807 | * | 12/1974 |
| JP | 60129472 | * | 7/1985 |
| JP | 61179461 | * | 11/1986 |
| JP | 6231778 | * | 2/1987 |
| JP | 62266271 | * | 11/1987 |
| JP | 10122422 | * | 5/1998 |
| JP | 10169834 | * | 6/1998 |
| JP | 11051217 | * | 2/1999 |
| JP | 11230407 | * | 8/1999 |
| JP | 2002048250 | * | 2/2002 |

* cited by examiner

*Primary Examiner*—John K Fristoe, Jr.
(74) *Attorney, Agent, or Firm*—Dorsey & Whitney LLP

(57) ABSTRACT

A flow rate regulation valve comprising a housing (11) formed with a valve hole (13), a needle valve (60) moved relative to the valve seat (16) in the housing, and a flow rate adjust knob (40) mounted at the proximal end of the needle valve extending from the housing, wherein the needle valve is moved relative to the valve seat by rotating the flow rate adjust knob thereby regulating the flow rate of fluid flowing through the valve hole, the flow rate regulation valve further comprising a knob fixing means (35) for stopping the rotation of the flow rate adjust knob. As a result, the flow rate is prevented from being changed accidentally by a user or the like. Further, the value may have a seal adjust means (20) adjusting the sealed state between the housing and the needle valve. The seal adjust means may be formed as a part of the housing, and may be fixed to the housing by a fixing pin (15).

1 Claim, 4 Drawing Sheets

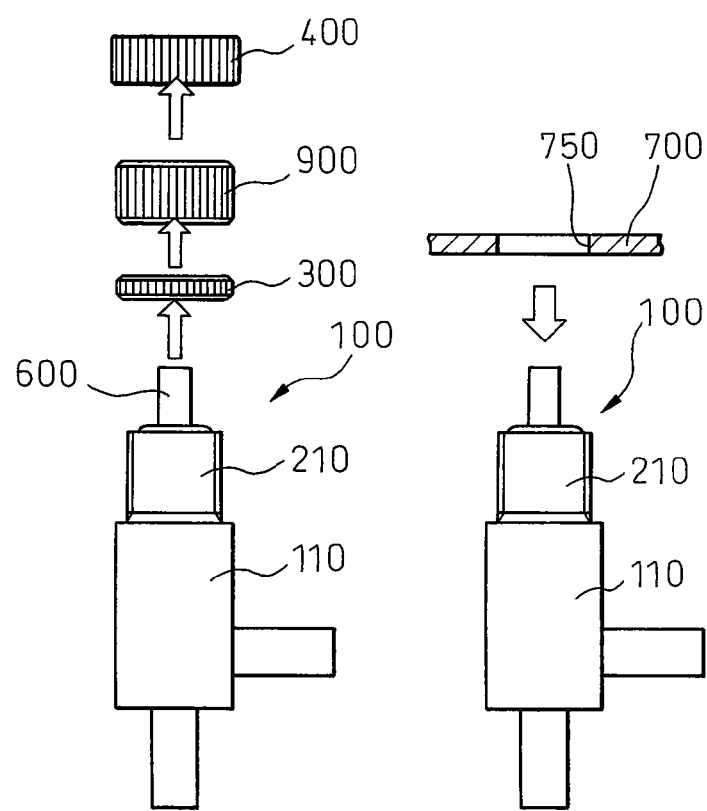
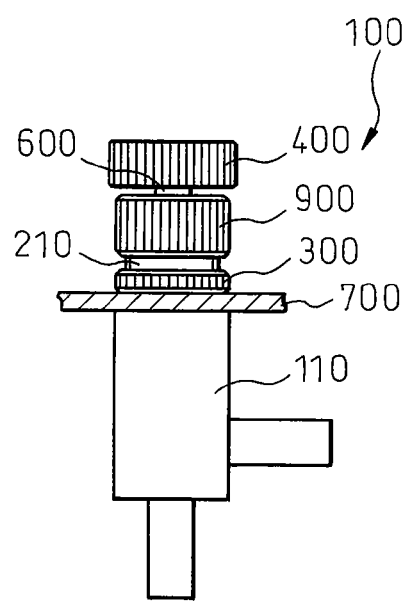
Fig.4a  Fig.4b  Fig.4c

FLOW RATE REGULATION VALVE

TECHNICAL FIELD

This invention relates to a flow rate regulation valve for regulating flow rate by moving a needle valve relative to a valve seat.

BACKGROUND ART

The flow rate regulation valve disclosed by, for example, Japanese Unexamined Patent Publication No. 11-230407 is currently used in various fields. This flow rate regulation valve includes a housing, in which a valve hole is formed, a needle valve that is adapted to move relative to the valve seat in the housing, a flow rate adjust knob mounted at the proximal end of the needle valve extending from the housing, a seal nut for adjusting the sealed state between the housing and the needle valve, and a panel nut for fixing the housing to a panel, wherein by rotating the flow rate adjust knob, the needle valve is moved relative to the valve seat thereby regulating the flow rate of fluid flowing through the valve hole.

This flow rate regulation valve, if used as a component part of a semiconductor manufacturing device, is mounted on the operation panel of the semiconductor manufacturing device or the housing of the semiconductor manufacturing device. FIGS. 4a to 4c are diagrams for explaining the manner in which an ordinary flow rate regulation valve is mounted on the panel. As shown in these drawings, if a flow rate regulation valve 100 is mounted on a panel 700, a flow rate adjust knob 400, a seal nut 900 and a panel nut 300 are removed in that order (FIG. 4a), and an extension 210 of the housing 110 from the proximal end of the needle valve 600 is inserted into a hole 750 formed in advance in the panel 700 (FIG. 4b). The panel nut 300 is them mounted on the extension 210, the flow rate regulation valve 100 is fixed, and the seal nut 900 and the flow rate adjust knob 400 are mounted again to make the flow rate regulation valve available for use (FIG. 4c).

After the flow rate regulation valve 100 is mounted on the panel 700, however, the flow rate adjust knob 400 is left exposed. Therefore, a user may accidentally touch the knob 400 of the flow rate regulation valve 100 causing the preset flow rate regulation valve 100 to change.

In the case where the knob 400 of the flow rate regulation valve 100 is rotated accidentally, not only the flow rate changes, but also the needle valve 600 rotates, together with the knob 400, resulting in that particles may develop due to frictional wear between the needle valve 600 and the housing 100, and therefore may intrude into the fluid. Especially, in the case where the needle valve 600 comes in contact with the valve seat, the particles generated by the frictional wear between the needle valve 600 and the valve seat also intrude into the fluid.

Further, as described above with reference to FIGS. 4a to 4c, the user removes the seal nut 900 provisionally to mount the flow rate regulation valve on the panel 700. The seal nut 900 is a part for setting the sealed state of the flow rate regulation valve. Once the seal nut 900 is removed, another problem may occur in that the same sealed state of the flow rate regulation valve as when it was shipped cannot be maintained.

This invention has been achieved in view of this situation and the object of this invention is to provide a flow rate regulation valve capable of preventing the flow rate from being changed by accidental operation of a user or the like.

DISCLOSURE OF THE INVENTION

In order to achieve the object described above, according to a first aspect of the invention, there is provided a flow rate regulation valve comprising a housing formed with a valve hole, a needle valve adapted to move relative to the valve seat in the housing, and a flow rate adjust knob mounted at the proximal end of the needle valve extending from the housing, wherein the needle valve is moved relative to the valve seat by rotating the flow rate adjust knob thereby regulating the flow rate of fluid flowing through the valve hole, the flow rate regulation valve further comprising a knob fixing means for stopping the rotation of the flow rate adjust knob.

Specifically, in the first aspect, at the time of operating the flow rate adjust knob, the fixed state of the flow rate adjust knob must be released by the knob fixing means. In the case where a user or the like accidentally touches the flow rate adjust knob, the flow rate of the flow rate regulation valve is prevented from being changed. A lock nut is preferably used as a knob fixing means.

According to a second aspect, in the first aspect, the size of the knob fixing means is at least larger than the size of the flow rate adjust knob.

Specifically, in the second aspect, a user can hold both the flow rate adjust knob and the knob fixing means at the same time with one hand, and after loosening the knob fixing means located far from the user, can adjust the flow rate adjust knob. Therefore, the flow rate of the flow rate regulation valve can be easily adjusted.

According to a third aspect, in the first or second aspect, the sealed state between the housing and the needle valve is adjusted further by a seal adjust means which is formed as a part of the housing and fixed on the housing by a fixing pin, Specifically, in the third aspect, the seal adjust means is fixed, and therefore, the initial value of the sealed state preset by the manufacturer is prevented from being changed in operation. Incidentally, the fixing pin is a spring roll pin, for example.

According to a fourth aspect, there is provided a flow rate regulation valve comprising a housing formed with a valve hole, a needle valve adapted to move relative to the valve seat in the housing and a flow rate adjust knob mounted at the proximal end of the needle valve extending from the housing, wherein the needle valve is moved relative to the valve seat by rotating the flow rate adjust knob thereby adjusting the flow rate of fluid flowing through the valve hole, wherein the needle valve includes a first portion coupled to the flow rate adjust knob and a second portion adapted to engage with the valve seat, and wherein the first portion and second portion are coupled to each other in such a manner that the rotation of the first portion based on the rotation of the flow rate adjust knob may not be transmitted to the second portion.

Specifically, in the fourth aspect, at the time of adjusting the flow rate by rotating the flow rate adjust knob, the second portion of the needle valve is prevented from coming into contact with the inner wall of the housing and generating particles by frictional wear. Especially, in the case where the flow rate regulation valve is in a closed state, particles are also prevented from being generated between the forward end of the needle valve and the valve hole.

According to a fifth aspect, in the fourth aspect, the first portion of the needle valve is formed with a thread adapted to be screwed into the housing, and a seal member is arranged around the needle valve between the thread and the valve hole.

Specifically, in the fifth aspect, even in the case where the thread of the needle valve generates particles by being worn, the presence of the seal member prevents the particles generated on the thread from intruding into the fluid.

According to a sixth aspect, there is provided a flow rate regulation valve comprising a housing formed with a valve hole, a needle valve adapted to move relative to the valve seat in the housing and a flow rate adjust knob mounted at the proximal end of the needle valve extending from the housing, wherein the needle valve is moved relative to the valve seat by rotating the flow rate adjust knob thereby adjusting the flow rate of fluid flowing through the valve hole, wherein a sleeve extends from the peripheral surface of the flow rate adjust knob, and the sleeve is formed in such a manner as to cover the peripheral surface of the seal adjust means.

Specifically, in the sixth aspect, the seal adjust means is covered by the sleeve, and therefore, the seal adjust means is prevented from being accessed accidentally by a user or the like.

The first to fifth aspects share a common advantage in that the flow rate is prevented from being changed accidentally by a user or the like.

Further, in the second aspect, the flow rate of the flow rate regulation valve can be easily adjusted.

Further, in the third aspect, the initial value of the sealed state preset by the manufacturer is prevented from being changed at the time of mounting to a mounting panel.

Further, in the fourth aspect, there is an advantage in that that particles are prevented from being generated by wear resulting from contact between the second portion of the needle valve and the inner wall of the housing.

Further, in the fifth aspect, it is prevented the particles generated on the thread from intruding into the fluid.

Further, in the sixth aspect, a user or the like is prevented from accidentally accessing the seal adjust means.

The above and other objects, features and advantages will be made apparent by the detailed description of typical embodiments of the invention taken in conjunction with the accompanying drawings.

BRIEF DESCRIPTION OF THE DRAWINGS

FIG. 4a is a first diagram explaining the manner in which an ordinary flow rate regulation valve is mounted on a panel.

FIG. 4b is a second diagram explaining the manner in which an ordinary flow rate regulation valve is mounted on a panel.

FIG. 4c is a third diagram explaining the manner in which an ordinary flow rate regulation valve is mounted on a panel.

BEST MODE FOR CARRYING OUT THE INVENTION

Figure 1A:
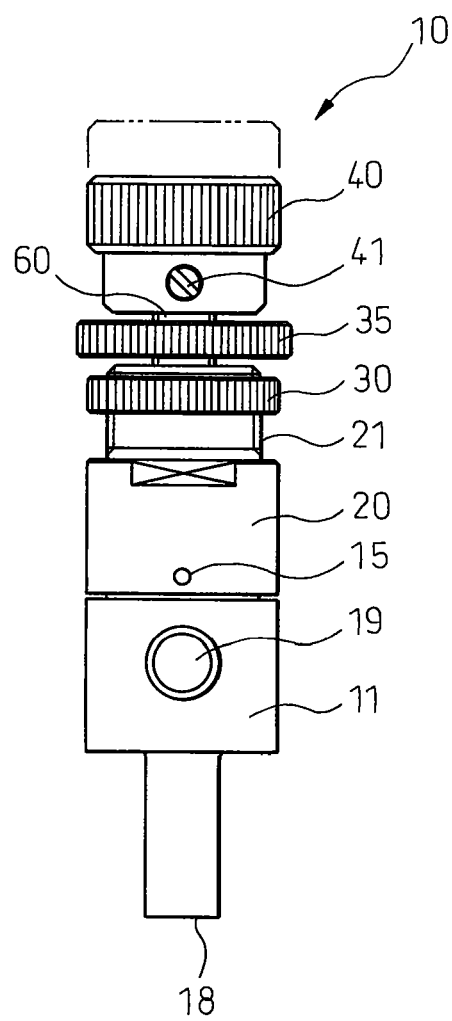
FIG. 1a is a front view of a flow rate regulation valve according to a first embodiment of the invention.

An embodiment of the invention is explained below with reference to the accompanying drawings. In the drawings explained below, similar component parts are designated by the same reference numerals, respectively. To facilitate understanding, the scale of the drawings has been appropriately changed.

Figure 1B:
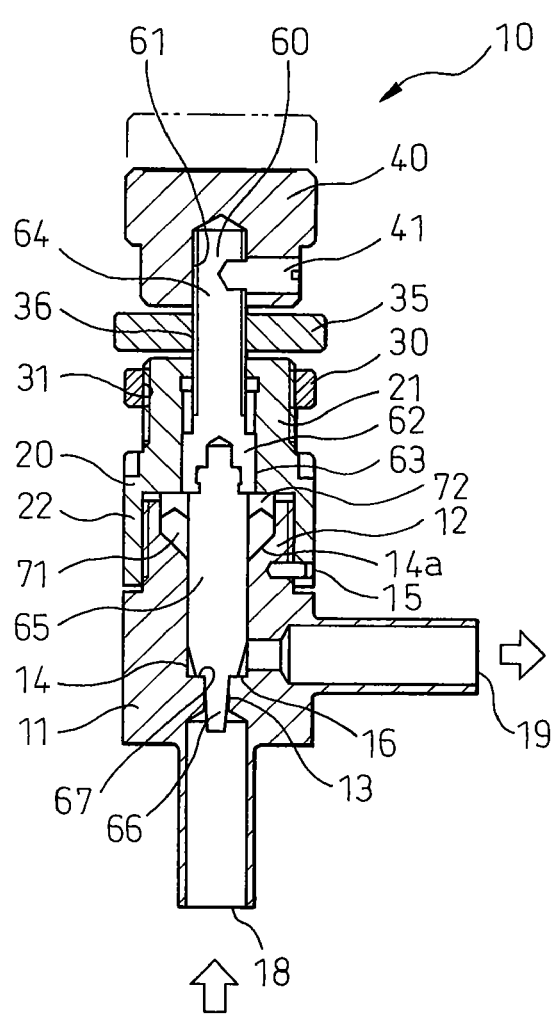
FIG. 1b is a side sectional view of a flow rate regulation valve according to the first embodiment of the invention.

FIG. 1a is a front view of a flow rate regulation valve according to a first embodiment of the invention, and FIG. 1b a side sectional view of the flow rate regulation valve according to the first embodiment of the invention. As shown in these drawings, the housing of the flow rate regulation valve 10 according to the invention is comprised of a lower portion 11 and an upper portion 20. The lower portion 11 of the housing is formed with a flow inlet 18 and a flow outlet 19 communicating with each other in the lower portion 11 through a valve hole 13 and an axial hole 14 described later.

As can be seen from FIG. 1b, the lower portion 11 of the housing has a lower sleeve 12 narrower than the lower portion 11. The upper portion 20 of the housing, on the other hand, is formed with an upper sleeve 22 adapted to engage with the lower sleeve 12. As shown, the upper portion 20 of the housing is screwed to the lower portion 11 by threads formed on the outer surface of the lower sleeve 12 and the inner surface of the upper sleeve 22. The upper portion 20 is fixed to the lower portion 11 by a spring roll pin 15 functioning as a fixing pin. The spring roll pin 15 connects the upper sleeve 22 of the upper portion 20 and the lower sleeve 12 of the lower portion 11 to each other. Normally, the spring roll pin 15 is located at a position inaccessible from the outside. Once the lower portion 11 and the upper portion 20 of the housing are assembled, a common axial hole 14 into which a major portion of the needle valve 60 is inserted is formed in the housing. The upper portion 20 and the lower portion 11 may be fixed to each other by other means than a spring roll pin 15.

Incidentally, according to the embodiment shown in FIGS. 1a, 1b, the upper portion 20 of the housing may function as a seal adjust member for adjusting the sealed state between the upper portion 20 and the needle valve 60. As shown, however, the upper portion 20 is normally fixed on the lower portion 11 by the spring roll pin 15. Specifically, according to the first embodiment of the invention, the initial value of the sealed state preset by the manufacturer is maintained, and therefore, even in the case where a user or the like touches the upper portion 20 of the housing, the sealed state between the upper portion 20 and the needle valve 60 remains unchanged. Especially, as explained with reference to FIG. 4, the seal nut is removed at the time of mounting the conventional flow rate regulation valve 100 on the panel, and therefore, the initial value of the sealed state may be changed. According to this invention, however, the upper portion 20 functioning as a seal adjust member is not required to be removed even at the time of mounting the panel, and therefore, the sealed state remains unchanged.

A cylindrical extension 21 narrower than the upper portion 20 extends from the upper portion 20 of the housing. Further, as shown, the needle valve 60 extends from above the extension 21. The outer surface of the extension 21 is formed with a thread, and a panel nut 30 is screwed to the thread of the extension 21. The panel nut 30 is used to fix the flow rate regulation valve 10 on a panel (not shown). Normally, the length of the extension 21 is larger than the panel thickness and the thickness of the panel nut 30 combined.

Further, as shown in FIG. 1b, a flow rate adjust knob 40 is mounted at the proximal end of the needle valve 60. The proximal end of the needle valve is inserted into the hole formed in the flow rate adjust knob 40, and the flow rate adjust knob 40 is fixed to the needle valve 60 by a fixing screw 41. Also, as shown in FIGS. 1a, 1b, a lock nut 35 described later is screwed to the thread 61 between the flow rate adjust knob 40 and the panel nut 30. As shown, the size of the lock nut 35 is larger than the size of the flow rate adjust knob 40 and the panel nut 30. Further, each peripheral surface of the flow rate adjust knob 40, the lock nut 35 and the panel nut 30 is knurled to permit a user to easily hold the flow rate adjust knob 40, the lock nut 35 and the panel nut 30, respectively.

Also, as shown in FIG. 1b, the needle valve 60 is configured of a first portion 64 fixed on the flow rate adjust knob 40 and a second portion 65 including the valve body 67. The first portion 64 includes a wide portion 62 connected to the second portion 65, and a thread 63 is formed on the peripheral surface of the wide portion 62. As shown, the thread 63 is screwed into the thread formed on the inner surface of the extension 21 of the upper portion 20. In the presence of these threads, the needle valve 60 is moved in an axial direction by rotating the flow rate adjust knob 40.

The lower portion 11 of the housing is formed with a narrow valve hole 13 communicating with the flow inlet 18. As shown, the valve hole 13 is narrower than the axial hole 14, and the valve seat 16 is formed between the axial hole 14 and the valve hole 13. A valve front end 66 extends from the valve body 67 of the second portion 65. In FIGS. 1a, 1b, the flow rate regulation valve 10 is in a closed state, and therefore, the valve body 67 of the second portion 65 abuts on the valve seat 16, and the valve front end 66 of the second portion 65 is inserted in the valve hole 13. By rotating the flow rate adjust knob 40, the flow rate adjust knob 40 can move to the position indicated by the one-dot chain in the drawing, thereby opening the flow rate regulation valve 10.

Also, as shown in FIG. 1b, a substantially truncated cone-shaped first packing 71 is fitted on the slope 14a of the axial hole 14 around the second portion 65 below the wide portion 62. Further, a second packing 72 having a flange extending between the lower portion 11 and the upper portion 20 is arranged above the first packing 71. Each of the first packing 71 and the second packing 72 may be a single unit member.

As described above, the lock nut 35 is screwed to the thread 61 of the first portion 64 of the needle valve 60. The lock nut 35 functions to restrict the rotation of the flow rate adjust knob 40. According to the embodiment shown in FIGS. 1a, 1b, the lock nut 35, while located at a position adjacent to the extension 21 of the upper portion 20 of the housing, fixes the flow rate adjust knob 40 so as not to rotate. In the process, even in the case where a user or the like touches the flow rate adjust knob 40, the flow rate adjust knob 40 is not rotated, and therefore, the flow rate of the flow rate regulation valve 10 is not changed. Once the lock nut 35 is loosened and a gap, which is more than a predetermined amount, is formed between the lock nut 35 and the extension 21, the flow rate adjust knob 40 is allowed to rotate thereby to adjust the flow rate of the flow rate regulation valve 10.

In mounting the flow rate regulation valve 10 on the panel (not shown), the flow rate adjust knob 40, the lock nut 35 and the panel nut 30 are removed in that order in substantially the similar steps as in FIG. 4. Then, the extension 21 of the housing is inserted into the hole of the panel (not shown). The panel hole corresponds to the size of the extension 21, and therefore, the panel stops just before the upper portion 20. Then, the panel nut 30 is screwed to the extension 21, and the flow rate regulation valve 10 is fixed to the panel. The lock nut 35 and the flow rate adjust knob 40 are mounted again. As explained above, according to the first embodiment of the invention, the upper portion 20 of the housing functions as a seal adjust member, and the upper portion 20 is not required to be removed at the time of mounting the flow rate regulation valve 10. Therefore, the sealed state between the needle valve 60 and the housing when it was shipped can be maintained as it is.

When the flow rate regulation valve 10 according to the first embodiment of the invention is in operation, the lock nut 35 is loosened to form a gap, which is more than a predetermined amount, between the lock nut 35 and the extension 21 of the upper portion 20. After that, the flow rate adjust knob 40 is rotated thereby to move the needle valve 60 upward. As a result, fluid flowing in from the flow inlet 18 passes through the valve hole 13 and the axial hole 14, and flows out from the flow outlet 19.

While a fluid of the desired amount is flowing out of the flow outlet 19 of the flow rate regulation valve 10, the lock nut 35 is moved adjacent to the extension 21 of the upper portion 20. As a result, the flow rate adjust knob 40 is fixed, and therefore, even in the case where a user or the like touches the flow rate adjust knob 40 accidentally, the flow rate of the flow rate regulation valve 10 remains unchanged.

In the case where a further increased flow rate of the flow rate regulation valve 10 is desired, on the other hand, the lock nut 35 is moved again away from the extension 21, and the flow rate adjust knob 40 is further rotated so that the needle valve 60 may move in the opening direction. In the case where a decreased flow rate of the flow rate regulation valve 10 is desired, the lock nut 35 may be moved again away from the extension 21 and the flow rate adjust knob 40 is rotated to move the needle valve 60 in the closing direction.

As described above, the size of the lock nut 34 is larger than the size of the flow rate adjust knob 40, and the flow rate adjust knob 40 is located on this side of the lock nut as viewed from the user. The user, when adjusting the flow rate of the flow rate regulation valve 10, therefore, holds both the flow rate adjust knob 40 and the lock unit 35 with one hand, and after loosening the lock nut 35 located far from the user, adjusts the flow rate adjust knob 40. In view of the fact that each of the lock nut 35 and the flow rate adjust knob 40 have sizes as described above, the user can easily adjust the flow rate of the flow rate regulation valve 10. This operation can be performed more advantageously than in the case where the size of the lock nut 35 is smaller than the size of the flow rate adjust knob 40. Further, by increasing the size of the lock nut 35 beyond the size of the panel nut 30, the installation of the flow rate regulation valve 10 is prevented from becoming unstable due to the panel nut 30 becoming inaccessible at the time of adjusting the lock nut 35 and the knob 40 after installing (mounting the panel) the flow rate regulation valve 10. Specifically, by maximizing the size of the lock nut 35, a user is made inaccessible to the panel nut 30 on the one hand, and the knob can be easily adjusted by a user on the other hand.

Also, according to the embodiment described with reference to FIGS. 1a, 1b, the upper portion 20 having the function as the seal adjust member is formed as a part of the housing. As an alternative, the seal adjust member can be arranged on the flow rate regulation valve 10 as an independent part. In such a case, the size of the lock nut 35 is preferably larger than the size of the seal adjust member, thereby apparently making it possible to prevent a user from touching the seal adjust member.

Figure 2A:
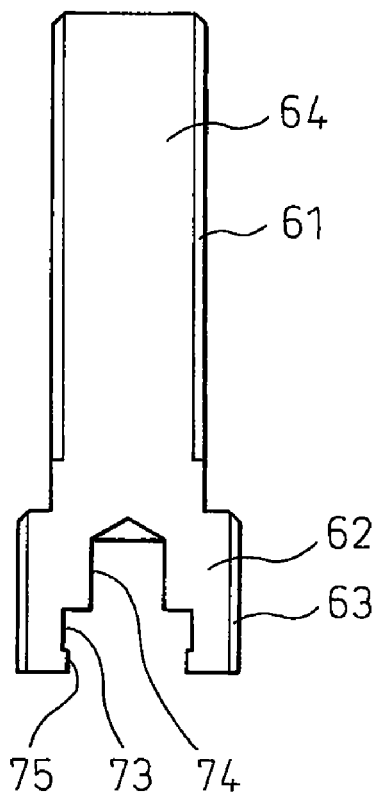
FIG. 2a is a first diagram explaining the coupled state of the needle valve shown in FIG. 1.
Figure 2A:
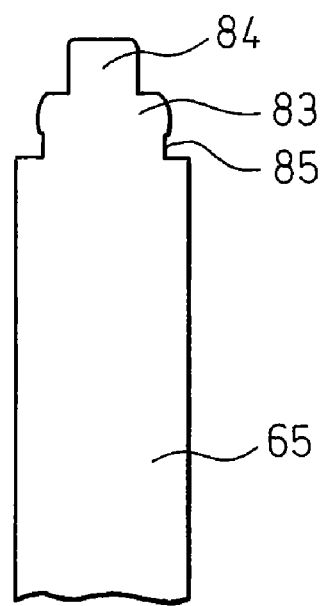
Figure 2B:
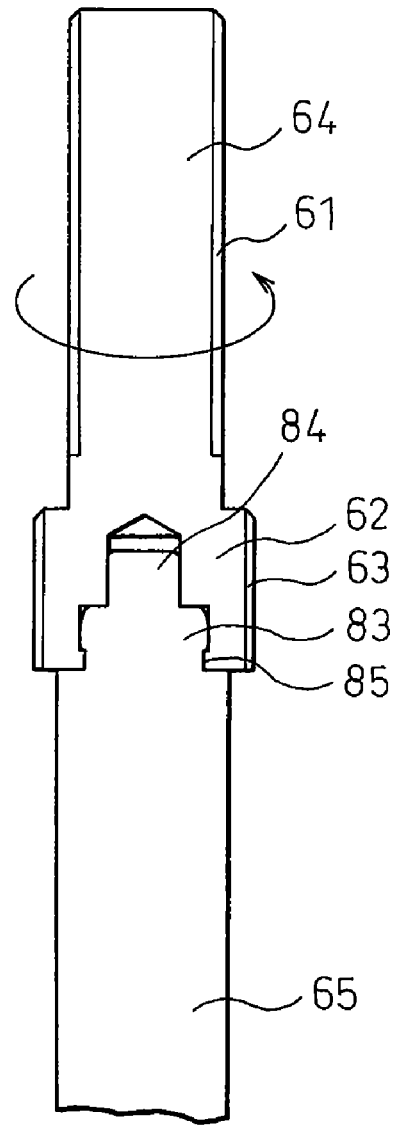
FIG. 2b is a second diagram explaining the coupled state of the needle valve shown in FIG. 1.

FIGS. 2a, 2b are first and second diagrams, respectively, for explaining the coupled state of the needle valve shown in FIG. 1. As shown in FIG. 2a, the wide portion 62 of the first portion 64 of the needle valve 60 is formed with an axially extending first hole 73 and a second hole 74 narrower than the first hole 73 and located concentrically with the first hole 73. Further, an annular protrusion 75 is projected radially inward from the inner wall of the first hole 73.

As shown in the lower part of FIG. 2a, on the other hand, the end of the second portion 65 far from the valve front end 66 is formed with a stepped portion 83, and an extension 84 narrower than the stepped portion 83 extends from the stepped portion 83. As shown, the stepped portion 83 and the extension 84 are arranged concentrically with the second portion 65 of the needle valve 60, and therefore, have a shape substantially corresponding to the first hole 73 and the second hole 74, respectively, of the first portion 64. The outer diameters of the stepped portion 83 and the extension 84, however, are somewhat smaller than the inner diameters of the first and second holes 73, 74, respectively. Further, as shown in FIG. 2a, the peripheral surface of the stepped portion 83 is formed with an annular depression 85 along the same peripheral surface.

As shown in FIG. 2b, when the first portion 64 and the second portion 65 are connected to each other, the extension 84 and the stepped portion 83 of the second portion 65 are inserted into the first hole 73 and the second hole 74, respectively, of the first portion 64, so that the second portion 65 engages with the first portion 64 by snap fitting. In the process, the protrusion 75 of the first portion 64 engages with the annular depression 85 of the second portion 65.

Once the first portion 64 and the second portion 65 are coupled to each other, a slight gap is formed between the first hole 73 and the stepped portion 83 and between the second hole 74 and the extension 84. Since the protrusion 75 engages with the depression 85, however, the second portion 65 is suspended from the first portion 64. Once the first portion 64 and the second portion 65 are coupled to each other, the second portion 65 will not separate from the first portion 64.

The needle valve 60 formed in this way, as described above with reference to FIG. 1b, is built into the flow rate regulation valve 10 with the thread 63 screwed to the inside of the upper portion 20. Upon rotation of the flow rate adjust knob 40 fixed at the end of the first portion 64, the needle valve 60 is moved by the thread 63 in the opening or closing direction. According to this invention, in contrast, due to the protrusion 75 the second portion 65 is prevented from separating and therefore, even in the case where the first portion 64 is rotated by the flow rate adjust knob 40, the second portion 65 only moves axially but is not rotated although the second portion 65 freely rotates.

As can be seen from FIG. 1b, the rotation of the second portion 65 may cause the second portion to be worn by the inner wall of the axial hole 14 and may generate particles. According to this invention, however, the second portion is not rotated, and therefore, no such particles are generated. Especially, upon rotation of the flow rate adjust knob 40 with the flow rate regulation valve 10 in a closed state may cause the valve front end 66 and the valve body 67 to be worn by the valve hole 13 and the valve seat 16, respectively. According to this invention, however, the second portion 65 is not rotated and neither is the valve front end 66 nor the valve body 67. Therefore, particle generation can be especially minimized in the close valve state.

Also, the wide portion 62 of the needle valve 60 is screwed to the inner wall of the upper portion 20 of the housing, and therefore, particles may be generated by the wear of the screwed portion at the time of adjusting the flow rate regulation valve 10. According to this invention, however, the first packing 71 and the second packing 72 are arranged below the screwed portion, i.e. between the screwed portion and the valve hole 13. Therefore, particles which may be generated in the screwed portion are captured by the first and second packings 71, 72 and prevented from intruding into the fluid.

Figure 3A:
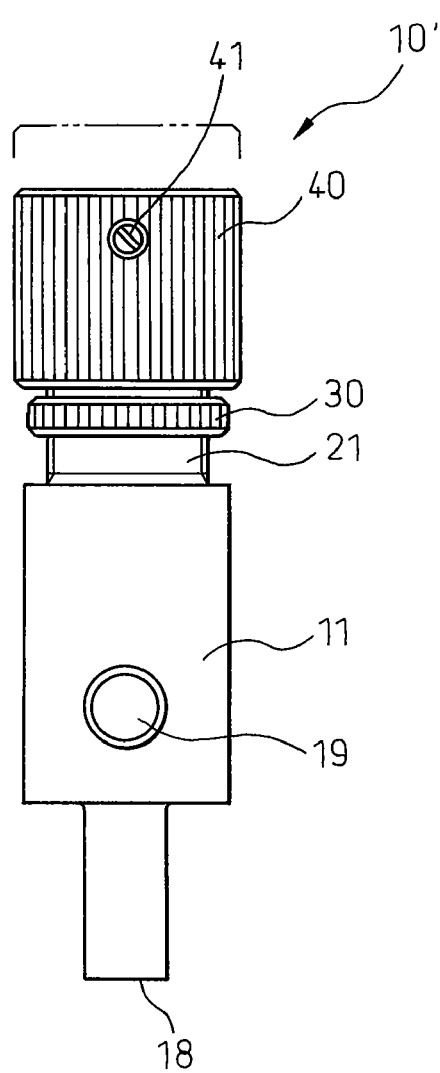
FIG. 3a is a front view of a flow rate regulation valve according to a second embodiment of the invention.
Figure 3B:
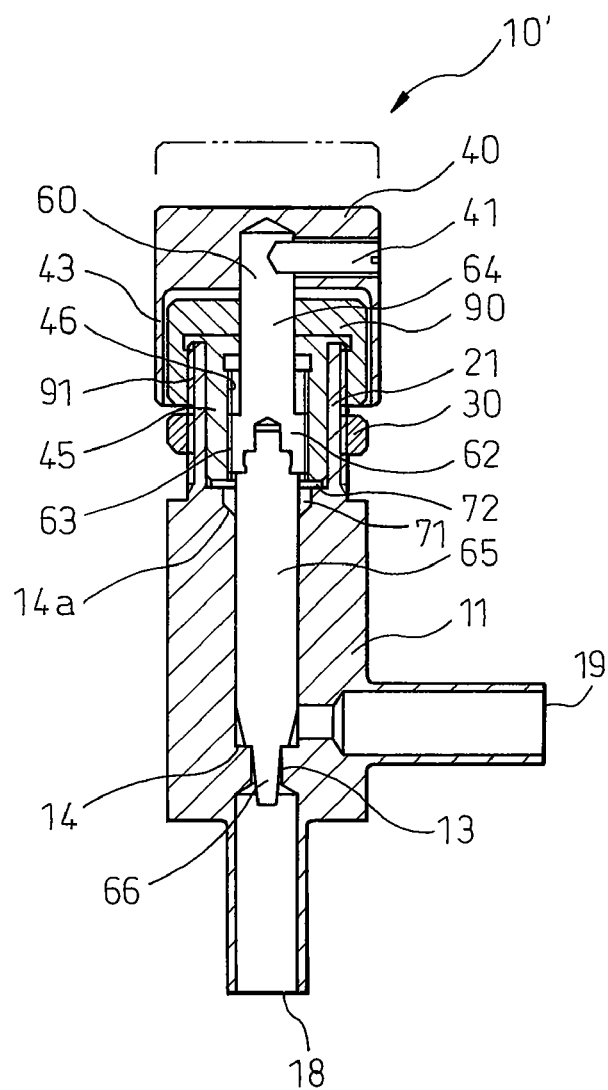
FIG. 3b is a side sectional view of a flow rate regulation valve according to the second embodiment of the invention.

FIG. 3a is a front view of the flow rate regulation valve according to the second embodiment of the invention, and FIG. 3b a side sectional view of the flow rate regulation valve according to the second embodiment of the invention. In FIGS. 3a and 3b, the members designated by the same reference numerals as those in FIGS. 1a, 1b are substantially similar to them and therefore not described in detail. Only members requiring explanation are explained again.

As shown in FIG. 3a, the housing 11 of the flow rate regulation valve 10' according to the second embodiment is formed of a single member including the upward extension 21. As shown in FIG. 3b, a sleeve-like adjust nut 45 is inserted on the inside of the extension 21. According to the second embodiment of the invention, therefore, the thread 63 of the wide portion 62 of the needle valve 60 is screwed to the thread 46 formed on the inner surface of the adjust nut 45.

Further, as can be seen from FIG. 3b, the seal nut 90 is arranged to contain the adjust nut 45 and the extension 21. As shown, the thread 91 formed on the inner wall of the seal nut 90 is screwed to the thread on the peripheral surface of the extension 21. Therefore, the seal nut 90, once rotated, is moved in axial direction.

With the downward movement of the seal nut 90, the adjust nut 45 is also moved down. Since the adjust nut 45 urges the first packing 71 and the second packing 72 downward, the sealed state between the second portion 65 of the needle valve 60 and packings 71, 72 is improved. In similar fashion, upon upward movement of the seal nut 90, the force of the adjust nut 45 urging the first packing 71 and the second packing 72 is reduced, result in that the sealed state between the second portion 65 and the packings 71, 72 is decreased. Also, the panel nut 30 is similarly screwed to the thread on the peripheral surface of the extension 21 below the seal nut 90.

In the case where the seal nut 90 is formed separately from the housing 11, a user or the like may touch the seal nut 90, especially, at the time of mounting the panel (not shown) and the sealed state may change. According to the second embodiment of the invention, however, the sleeve 43 extends downward from the lower end of the flow rate adjust knob 40. In the embodiment shown, the sleeve 43, though integrated with the flow rate adjust knob 40, may alternatively be mounted on the side surface of the flow rate adjust knob 40 as a member independent of the flow rate adjust knob 40.

As can be seen from FIG. 3b, the inner diameter of the sleeve 43 is larger than the outer diameter of the seal nut 90. The sleeve 43 extends sufficiently to surround the peripheral surface of the seal nut 90. Specifically, the sleeve 43 functions as a protective wall, and therefore, a user or the like cannot normally access the seal nut 90 from the outside. According to the second embodiment of the invention, therefore, a user or the like is prevented from accidentally accessing the seal nut 90, and thus the sealed state is prevented from being changed. Further, although in the embodiments described above the lock nut 35 for fixing the flow rate adjust knob 40 is used, any means capable of fixing the flow rate adjust knob 40 can alternatively be employed. Some of the component elements included in the embodiments described above may be appropriately replaced without departing from the scope of the invention.

This invention has been explained above with reference to typical embodiments. In addition to the changes made above, it can be understood for those skilled in the art that the invention can be variously modified, omitted or added to without departing from the scope and spirit of the invention.

DESCRIPTION OF REFERENCE NUMERALS

10, 10' Flow rate regulation valve
11 Lower portion of housing
12 Lower sleeve
13 Valve hole
14 Axial hole
14a Slope
15 Spring roll pin
16 Valve seat
18 Flow inlet
19 Flow outlet
20 Upper portion of housing
21 Extension
22 Upper sleeve
30 Panel nut
35 Lock nut
40 Flow rate adjust knob
41 Fixing screw
43 Sleeve
45 Adjust nut
46 Thread
60 Needle valve
62 Wide portion
64 First portion
65 Second portion
66 Valve front end
67 Valve body
71, 72 Packing
73, 74 Hole
75 Protrusion
83 Stepped portion
84 Extension
85 Depression
90 Seal nut

The invention claimed is:

1. A flow rate regulation valve comprising:
a housing formed with a valve hole;
a needle valve adapted to move relatively to the valve seat in the housing; and
a flow rate adjust knob mounted at the proximal end of the needle valve extending from the housing;
wherein the needle valve is moved relative to the valve seat by rotating the flow rate adjust knob thereby to adjust the flow rate of fluid flowing through the valve hole;
the flow rate regulation valve further comprising a sleeve extending from the peripheral surface of the flow rate adjust knob, and the sleeve being formed in such a manner as to cover a seal adjust means,
wherein the seal adjust means includes:
an extension extending upwardly from the housing,
a sleeve-like adjust nut inserted on an inside of the extension, and
a seal nut having an axial cross-section that is an inverted U-shape, and
arranged to contain the adjust nut and the extension, and
wherein an inner wall of the seal nut is screwed to a peripheral surface of the extension and the needle valve passes through an end surface of the seal nut.

* * * * *